Figure 4:
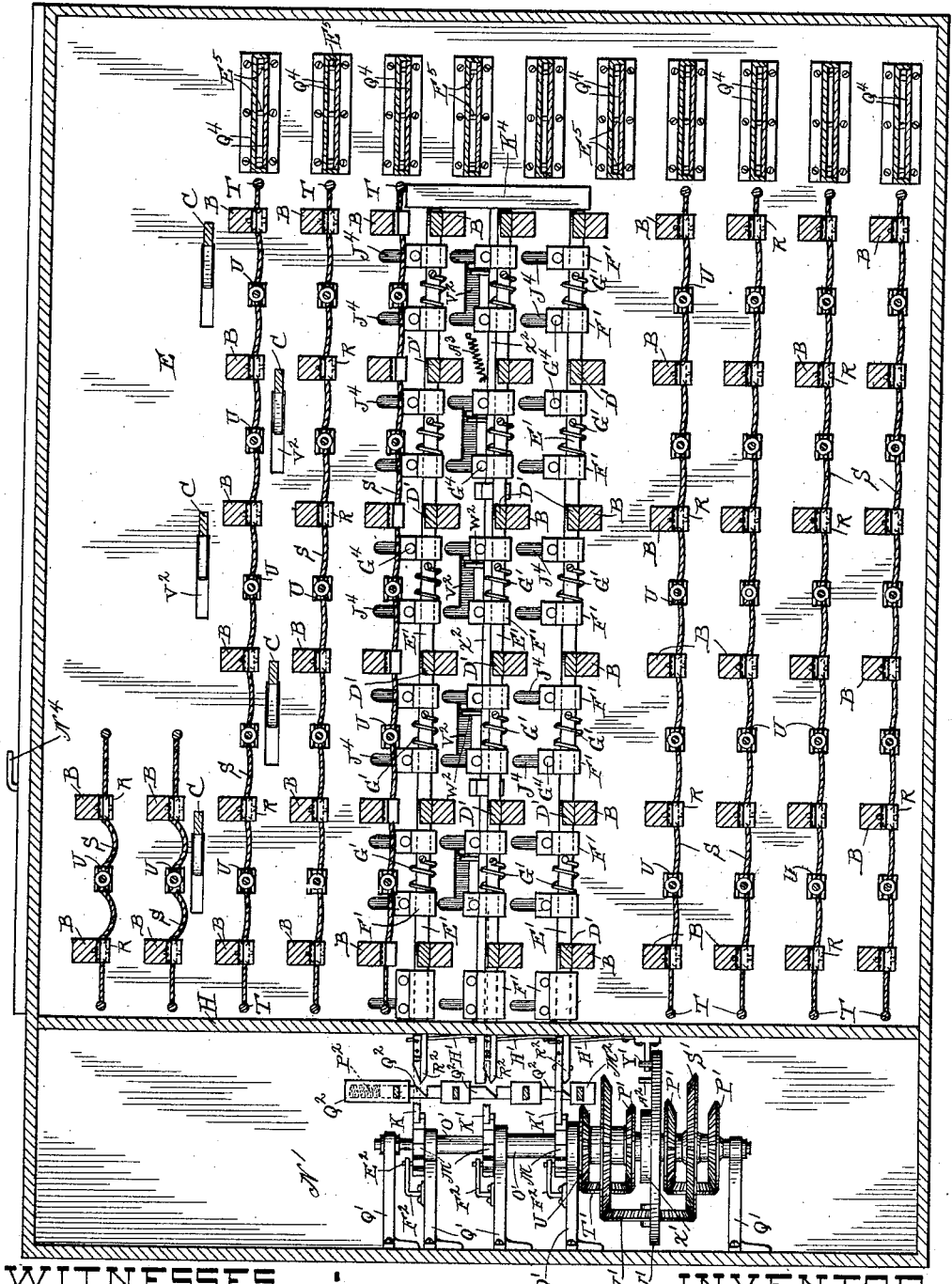

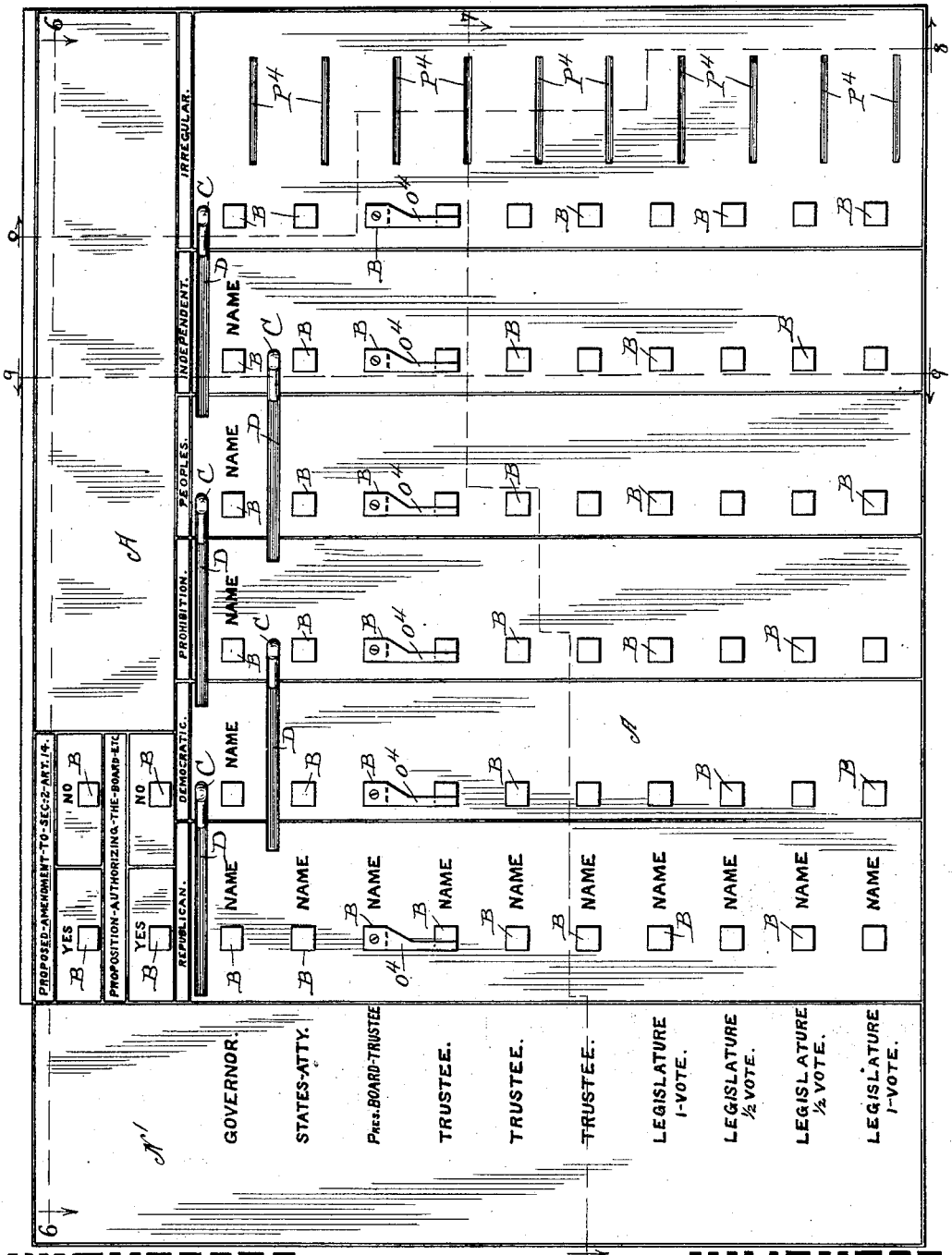
FIG. I.

J. H. McELROY.
VOTING MACHINE.
APPLICATION FILED OCT. 13, 1897.
1,066,639.
Patented July 8, 1913.
9 SHEETS—SHEET 2.
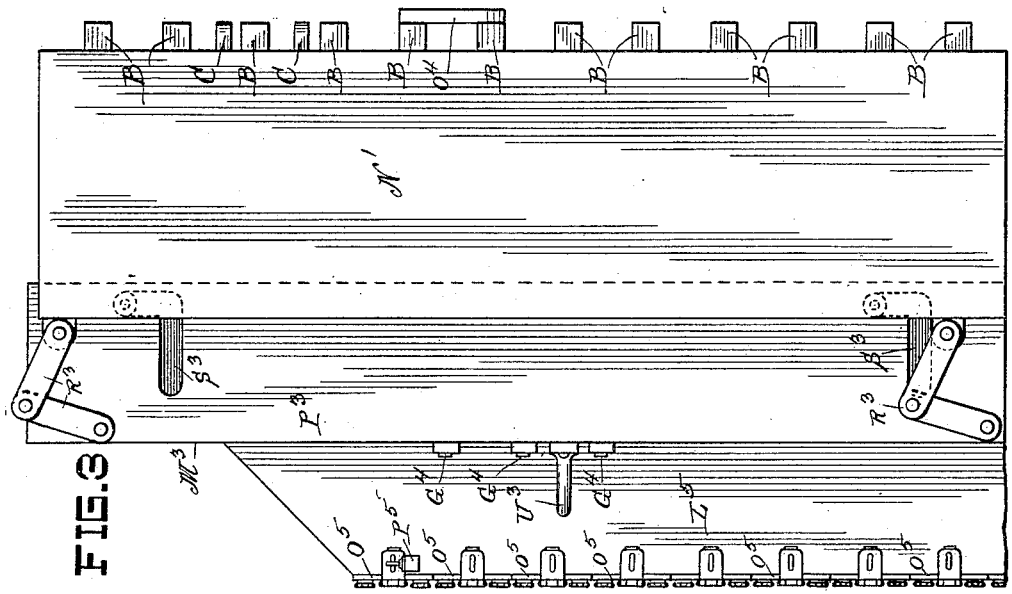
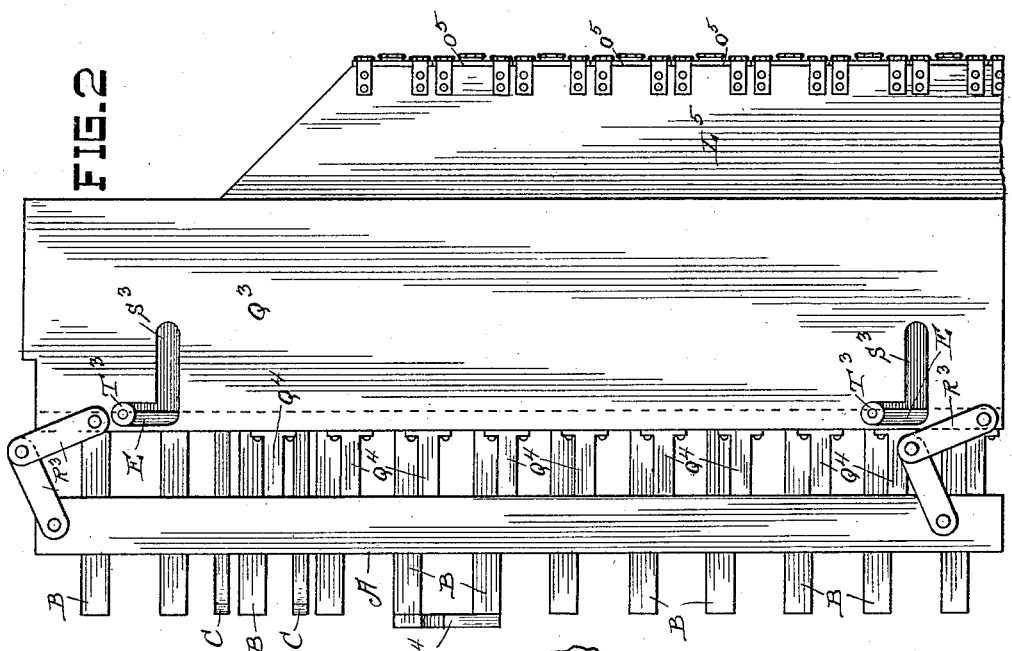
WITNESSES
Wm J. Martin.
R. J. Jacker.
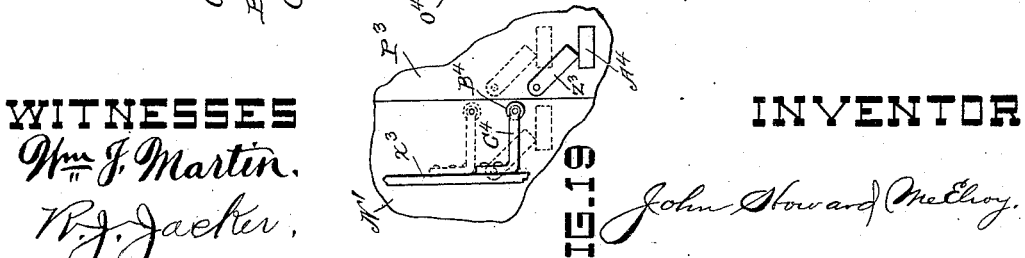
INVENTOR
John Howard McElroy.

J. H. McELROY.
VOTING MACHINE.
APPLICATION FILED OCT. 13, 1897.

1,066,639.

Patented July 8, 1913.

9 SHEETS—SHEET 3.

WITNESSES

INVENTOR

J. H. McELROY.
VOTING MACHINE.
APPLICATION FILED OCT. 13, 1897.

1,066,639.

Patented July 8, 1913.
9 SHEETS—SHEET 5.

WITNESSES

INVENTOR

J. H. McELROY.
VOTING MACHINE.
APPLICATION FILED OCT. 13, 1897.
1,066,639.
Patented July 8, 1913.
9 SHEETS—SHEET 6.
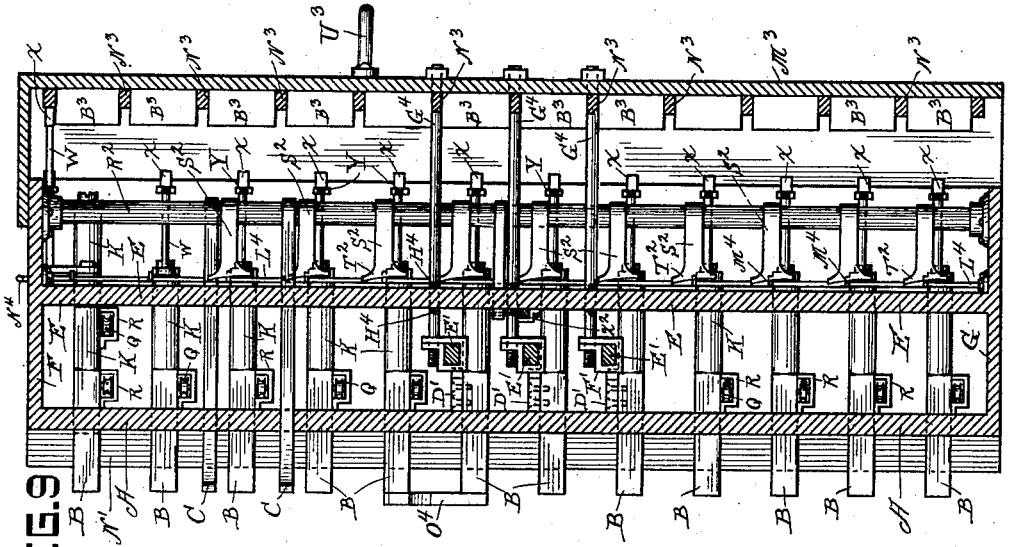
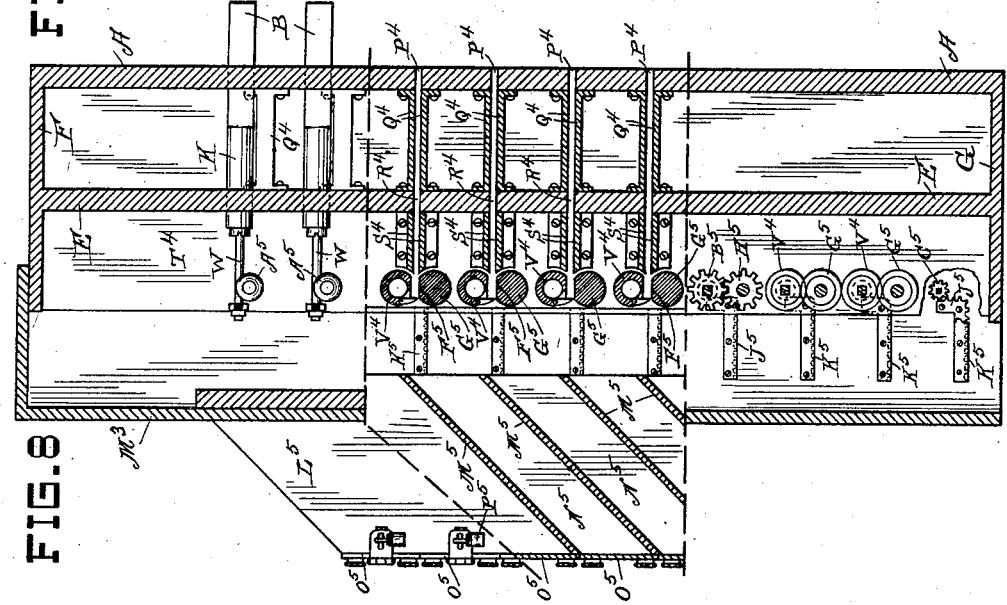
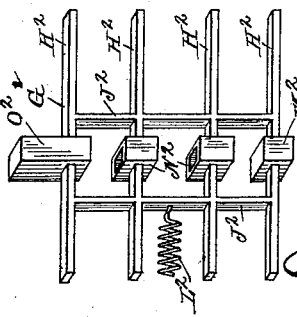
WITNESSES
Wm. J. Martin
R. J. Jacker.
INVENTOR
John Howard McElroy J. H. McELROY.
VOTING MACHINE.
APPLICATION FILED OCT. 13, 1897.
1,066,639.
Patented July 8, 1913.
9 SHEETS—SHEET 7.
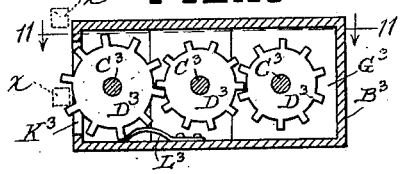
FIG.10
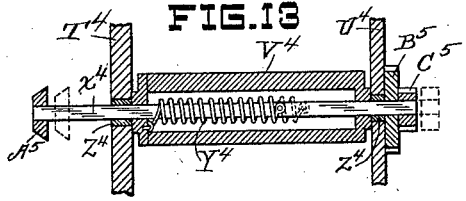
FIG.13
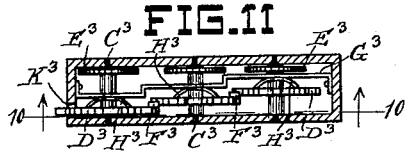
FIG.11
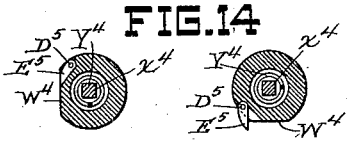
FIG.14
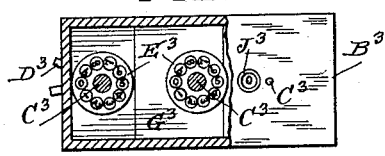
FIG.12
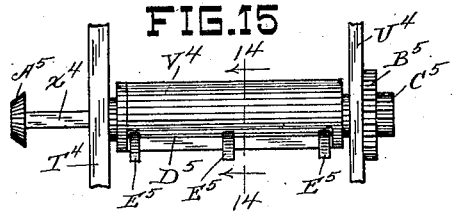
FIG.15
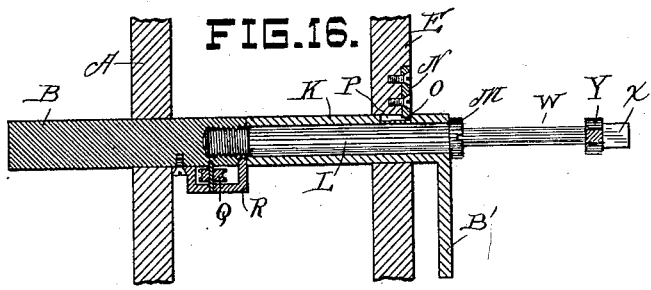
FIG.16.
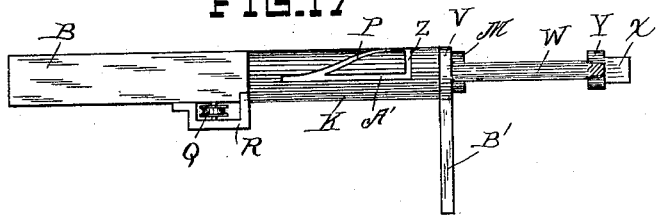
FIG.17
FIG.18
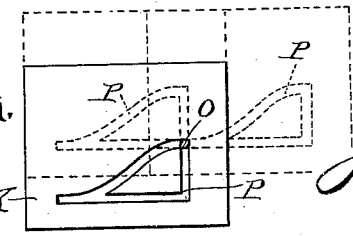
WITNESSES
Wm J. Martin.
R. J. Jacker.
INVENTOR
John Howard McElroy

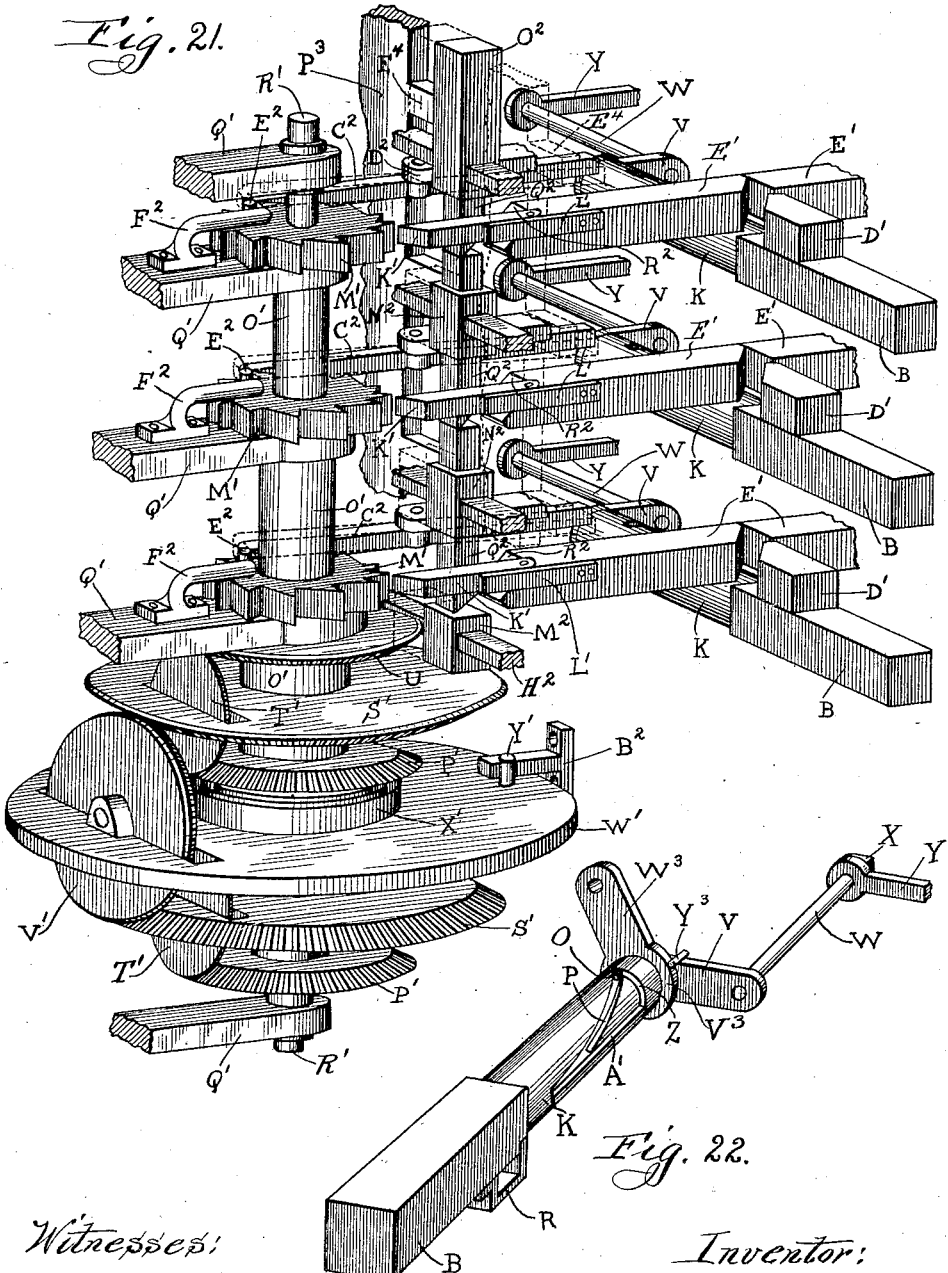

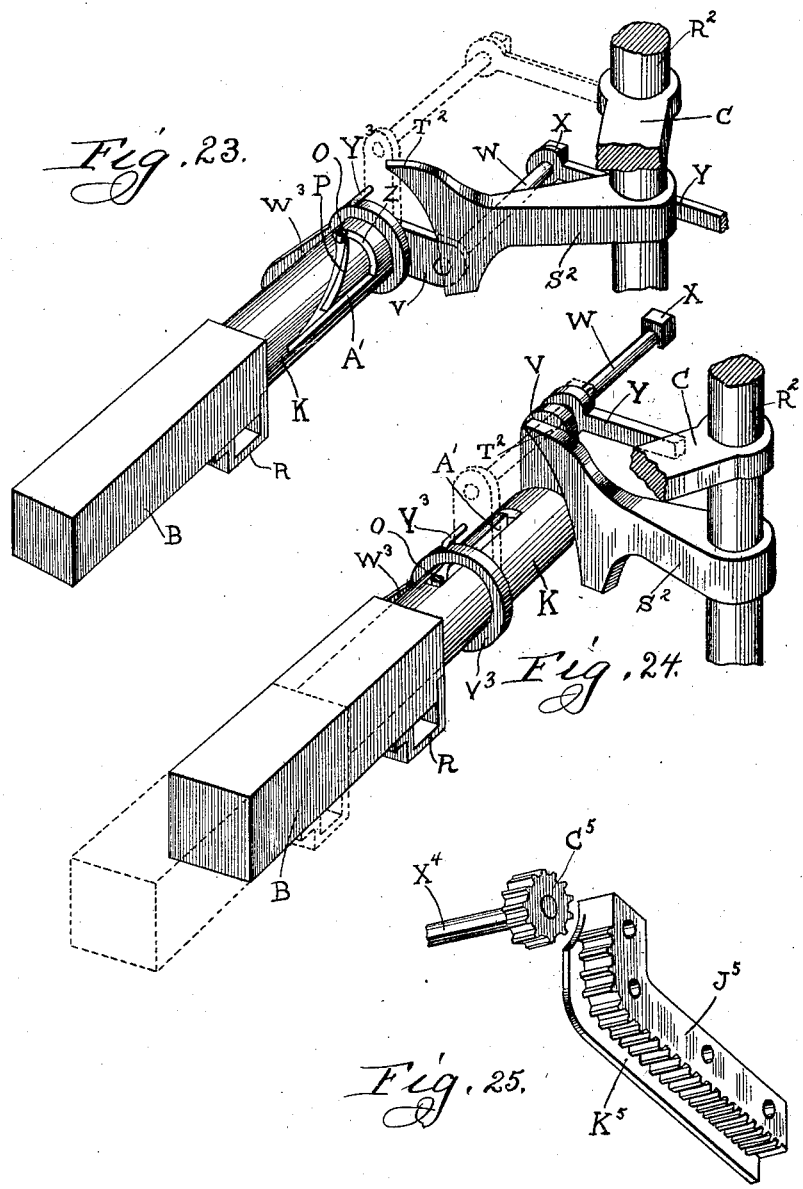

UNITED STATES PATENT OFFICE.

JOHN HOWARD McELROY, OF CHICAGO, ILLINOIS, ASSIGNOR TO EMPIRE VOTING MACHINE COMPANY, OF JAMESTOWN, NEW YORK, A CORPORATION OF NEW YORK.

VOTING-MACHINE.

1,066,639.  Specification of Letters Patent.  Patented July 8, 1913.

Application filed October 13, 1897.  Serial No. 655,060.

*To all whom it may concern:*

Be it known that I, JOHN HOWARD McELROY, a citizen of the United States, and residing at Chicago, in the county of Cook and State of Illinois, have invented certain new and useful Improvements in Voting-Machines, of which the following is a specification.

My invention relates to certain improvements in voting machines, namely, mainly to that class in which a register or other ballot indicating device is employed for each candidate, and in which the registers are grouped according to offices and according to parties and in which means are provided for casting what is known as a "straight" ticket by providing means for actuating all the registers devoted to the candidates of any particular party at one operation. In devices of this class, as heretofore patented, when it is desired to vote a mixed ticket, it is necessary to actuate each register separately, as there are no means provided whereby a candidate register can be operated before or after the operation of the straight ticket mechanism. In my improved construction, it is possible to vote a mixed ticket in either of the three ways provided for by the statutes of the Australian ballot in the State of Illinois: (1st.) By marking each candidate, and in my machine this result is effected by pressing in the key devoted to each candidate. (2nd.) By first marking the names of the candidates for the offices in which the regular ticket is to be scratched, and in then voting the straight ticket, which in my machine is performed by operating the registers separately for the candidates outside of the regular party, and by subsequently operating all the remaining registers of the regular party simultaneously. (3rd.) By first voting the straight ticket, and then scratching certain candidates thereon by voting for candidates for the same office in other parties, which is performed in my machine by simultaneously operating all the registers for the regular party ticket, and by subsequently operating the registers devoted to candidates outside of the regular party, the operation of which registers destroys or cancels the actuation of the registers for the candidates for the same office which have been operated in casting the straight ticket. By my improved construction I am enabled to vote a mixed ticket much more rapidly than by any other means hitherto employed, and furthermore, to comply with the present regulations relative to the method of voting such a ticket.

My invention further relates to an improvement in voting machines in which certain series of registers are arranged in such relation to another series of registers that the operation of one of said first mentioned series of registers is necessary before any of said second series can be operated. This construction is employed in order to insure a full vote being cast upon proposed constitutional amendments, etc., which often fail of passage, owing to the fact that the necessary majority do not vote for them, although there is no opposition to their passage. By thus associating the constitutional amendment register in relation to the registers for some political office, concerning which there is much interest manifested, the voters are compelled to register their wishes in regard to the proposed amendment before they can vote for the political office in which they are always interested.

My invention further provides for an improved construction in which, when a chairman or presiding officer of a series of officials is voted for, the voting for said person as a candidate for the chairman of the body will necessitate a vote being cast for him at the same time as a member of that body. This construction becomes important in what are known as multicandidate groups, as the law provides that a certain number of candidates shall be voted for, and if more than the required number is voted for, the entire individual ballot in this respect is thrown out as irregular, and it frequently happens that a voter will vote for one man as chairman, and also vote for the required number of other men without voting for the man previously voted for as chairman, thus necessitating the throwing out of the ballot in regard to these offices.

My invention further relates to a series of registers grouped for multicandidate purposes according to offices and to parties, and so arranged that where a mixed ticket is voted, but one register can be actuated at a time, but that where the straight ticket is being voted for, the number of candidates provided for by said straight ticket can be voted for simultaneously.

My invention further relates to a multicandidate device in which a locking mechanism is employed which is brought into operation when a certain number of candidates have been voted for by one individual so as to lock the machine and prevent him from voting for more candidates than he is entitled to. As these devices have been hitherto constructed, it has been necessary to provide means for preventing the simultaneous operation of two or more keys because the simultaneous actuation of said multicandidate device by two or more keys would only operate the multicandidate device once, thus permitting the voter to "beat" the machine by pressing in two keys simultaneously. In my improved construction if two or more keys are pressed in simultaneously, the multicandidate locking device will be operated two or more times, according to the number of keys pressed, and in this manner it becomes possible to construct a machine without employing the devices to prevent the simultaneous operation of the keys as stated above.

My invention is finally concerned with various combinations of elements adapted to carry out the various functions of the machine, all of which will be described in detail, and particularly pointed out in the claims.

To illustrate my invention, I annex hereto a set of drawings in which the same letters of reference are employed to designate identical parts in all the figures of which—

Figure 5:
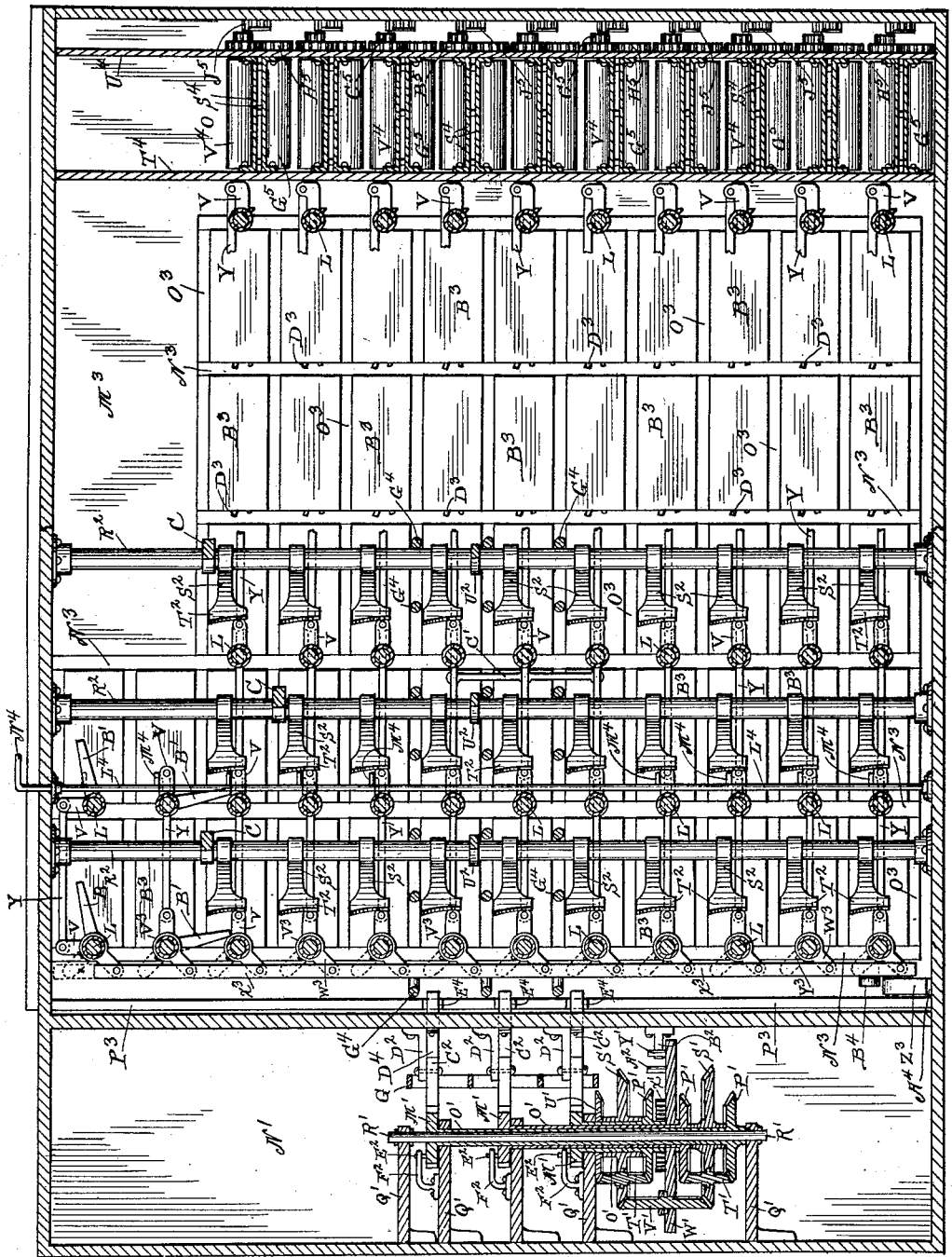
Figure 6:
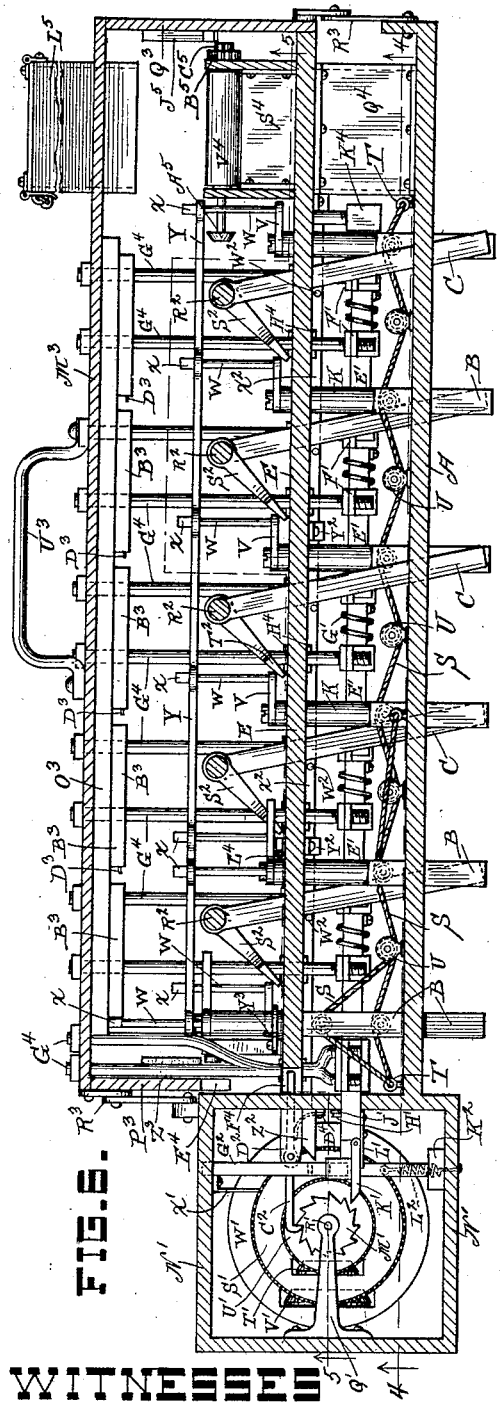
Figure 7:
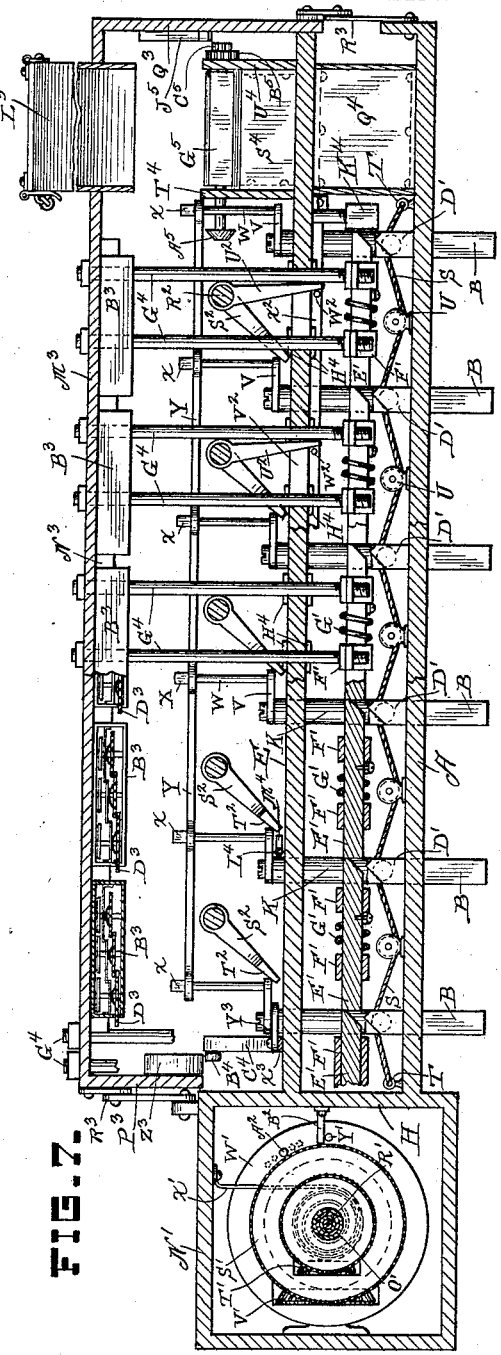

Figure 1 is a front elevation of the complete machine. Figs. 2 and 3 are right hand and left hand side elevations respectively. Fig. 4 is an elevation of the machine in section on the line 4—4 of Fig. 6. Fig. 5 is a similar view on the line 5—5 of Fig. 6. Fig. 6 is a plan view in section on the line 6—6 of Fig. 1. Fig. 7 is a similar view on the line 7—7 of Fig. 1. Fig. 8 is a side elevation in section on the line 8—8 of Fig. 1. Fig. 9 is a side elevation in section on the line 9—9 of Fig. 1. Fig. 10 is an elevation of one of the registers in section on the line 10—10 of Fig. 11. Fig. 11 is a plan view of one of the registers in section on the line 11—11 of Fig. 10. Fig. 12 is a rear elevation of one of the registers with a portion of the casing broken away. Fig. 13 is a central sectional view of one of the upper feed rollers of an irregular balloting mechanism. Fig. 14 is a sectional view in two different positions of the same roller on the line 14—14 of Fig. 15. Fig. 15 is an elevation of one of the said rollers. Fig. 16 is a central sectional view of one of the operating keys. Fig. 17 is an elevation of the same key. Fig. 18 is an extended plan view of the cylindrical surface of one of the keys, the dotted line showing the said surface in two other positions. Fig. 19 is a detail view of a portion of the re-setting mechanism. Fig. 20 is a perspective view of the frame for holding certain interlocking blocks. Fig. 21 is a perspective view, on an enlarged scale, of a portion of the multicandidate mechanism. Fig. 22 is an enlarged perspective view of one of the keys, showing the operation of a re-setting arm. Fig. 23 is a perspective view of one of the keys and the coöperating portion of the straight-ticket mechanism. Fig. 24 is a similar view, but showing the key in its operative position; and Fig. 25 is a perspective view of a portion of the irregular balloting mechanism.

In the drawings, A represents the front of the casing or face plate for the machine, which I intend or prefer to place in a partition of a booth, so that the voter entering the booth will have access to only one side of the machine, that in which the keys and ballot are located, while the other side of the machine will be accessible to the election officials, by whom I preferably arrange that the machine shall be re-set for each voter, although I might make said re-setting action automatic by reason of connecting it with the door of the booth, as is frequently done. Mounted in the front wall or face plate, A, of the casing is the selecting or voting mechanism, consisting of a series of projecting keys or ballot indicators, B, which, as will be seen in Fig. 1, may be arranged in vertical columns according to the parties, and in cross rows according to the offices. These keys are manipulated for voting purposes by pressing them in until their ends are flush with the casing, A, and they may be operated singly, if desired, or by parties, by operating the straight ticket levers, C, to be subsequently more fully described, which project through the slots, D, in the casing, one of these levers and slots being provided for each party.

At a suitable distance in the rear of the front plate, A, and parallel thereto, is a partition, E, which is connected to the front plate by the top piece, F, the bottom piece, G, and the end pieces, H and J, (the other end-piece J being omitted in Fig. 2 to show the parts beyond it) of the stationary portion of the casing. These plates, A and E, furnish the supports for the keys, B, which preferably slide in apertures therein. The ordinary keys, B, best shown in Figs. 16 to 18 and 22 to 24, consist of the square body portion which has its bearing in its aperture in the front plate, A, and the rotating portion which preferably takes the form of a cylindrical sleeve, K, which in that case is mounted upon the reduced end L of the key, which in that case has a solid circular cross section, and which may be conveniently formed of a screw, having the head, M, and which is screwed into the main body portion of the key, B, as clearly shown in Fig. 16.

The cylindrical sleeve of the key is mounted in the circular aperture in the partition, E, which aperture has mounted just above it a plate, N, fastened thereto, which has a spur, O, projecting downward into a groove, P, formed in the outer surface of the sleeve K, and of the shape shown in Figs. 17 and 18. By referring to the figures it will be readily seen that when the key is in the position of Figs. 16 and 17 and 22 and 23, and with the sleeve in the position shown in full lines in Fig. 18, that if the key be pushed inward, the lug, O, taking against the curved portion of the groove, P, will rotate the sleeve, K, during the inward motion of the key to the extent of 90°, and that the sleeve will assume the position shown in the right hand dotted line position of Fig. 18 and in Fig. 24, with the lug, O, in the extreme end of the curved portion of the groove, P. A small stationary pulley wheel, Q, is mounted beneath the key in the frame work, R, fastened to said key as shown, and a stout cord or cable, S, is passed over all of these pulleys, Q, in any horizontal row of keys being fastened at its ends to the posts, T, and passing through stationary pulleys, U, interposed between the keys and fastened to the rear of the plate, A, as best shown in Figs. 4, 6, and 7. These cables, S, are preferably made of fine twisted wire, so as to make them flexible and yet unyielding, and have just sufficient slack to permit one key to be pushed in to its innermost position, so that if one key be already pushed in and another key be pushed in, the pressing in of the second key will withdraw the first key. This constitutes interlocking or key-stop mechanism for single candidate groups.

Each of the sleeves, K, has on its end a radially extending arm, V, which has rigidly fastened thereto an eccentric portion preferably taking the form of a small rod, W, which is parallel to the main body of the key, but located at some distance therefrom, as shown in Figs. 6 and 7. These rods, W, terminate in a square end, X, for a purpose to be subsequently described. Loosely mounted on these rods, W, is a link, Y, for each horizontal row, the link consisting of a slender body portion enlarged at each key and furnished with an aperture at each enlargement through which the rod, W, passes. I have shown these links or rods as continuous but it will be understood that they may be made up of separate portions connected by links. From a consideration of the operation of the sleeves, K, and the links, Y, it will be seen that whenever a key is pressed in, that the turning of its sleeve portion, K, to the left through an angle of 90° will, owing to the rod, W, passing through the link, turn all of the sleeve portion, K, of the other keys in the same horizontal row. In this movement of the sleeve portion of the unmoved keys, the portions, Z, of the groove in the sleeve will pass by the lug, O, and the sleeve portion of the unoperated keys will assume the position shown in the left hand dotted line portion of Fig. 18 and in dotted lines in Fig. 23. In case any key has been pushed in, and another key in the same row is subsequently pushed in so that the first key is retracted by reason of the action of the cable, S, the sleeve portion of the retracted key will pass from the right hand dotted line position of Fig. 18 to the left hand dotted line position of the same figure and the entire key from the full line to the dotted-line position of Fig. 24, the straight portion, A', of the groove in the sleeve passing by the lug, O.

In the uppermost part of the machine I have shown two sets of keys, B, which are devoted to yes and no propositions, such as a proposed amendment to the constitution, or any other question that is to be submitted to the people for the vote. These questions are ordinarily voted on at a general election and it frequently happens when the voter has a large ticket to mark or vote, that he overlooks the proposed amendment, and it fails of passage because it does not obtain a majority of all the votes cast, although practically nobody votes against it. It frequently happens that amendments which are very much desired are overlooked for this reason and I have arranged the keys for these amendments in proximity to the most important office to be voted for, which in a presidential election would be the presidential electors, so that the voter is compelled to indicate his choice in the matter of the proposed amendment before he can vote for the principal office to be filled. To effect this result, I form upon the end of the sleeve, K, a downwardly projecting arm, B', whose downward end, in the unoperated position of the key, rests upon the arm portion, V, of the key directly below it, so as to prevent the turn of said arm portion, and consequently the voting of the key. This construction is best shown in Fig. 5, where I have arranged the arms B', of the upper pair of amendment keys to rest upon the arm portions, V, of the lower pair of amendment keys, whose arm portions, B', in turn rest upon the arms, V, of the governor candidate keys, B, directly below them. In all the figures I have shown the yes key of the upper amendment row pushed in so as to show the position of the key when it is operated. Of course it will be understood that if it is deemed desirable to permit the voter to vote without registering his choice upon the constitutional amendment, or other question, that a dummy key could be placed in the same line as the yes and no keys, so that the voter could release the governor keys without having to register his vote upon the constitutional amendment. This arrangement would be as satisfactory as the employment of simply the yes and no keys, as it would call the attention of the voter to the necessity of operating one of the three keys, and if he had any choice in the matter of the constitutional amendment he could vote for or against it as readily as he could operate the dummy key, so that the purpose of the construction will be fully subserved.

For operating the keys of the ordinary candidate registers, where but one of a number of candidates is to be elected, the construction hitherto described is sufficient, but in case several candidates for the same office are to be elected, what is known as the multicandidate group becomes necessary. In the drawings, I have shown the three trustees as grouped for multicandidate purposes. It will be understood that it is necessary that the voter shall be able to vote for any three of the fifteen candidates presented, irrespective of their parties or locations, and for this purpose, the ordinary interlocking mechanism can not well be adapted, so I employ the especial form to be now discussed. For the multicandidate group, I do away with the cables, S, but I couple the bars, Y, by means of the cross bar, C', shown in Fig. 5, so that when any key of the entire multicandidate group is operated, the sleeves, K, of all of said group will be turned to prevent the operation of the straight ticket device in the manner to be subsequently described. As it may be desired to vote for three candidates from three different parties, in which case all of the registers might be in the same horizontal line, it becomes necessary to provide means whereby a key in any horizontal line may be operated, and then another key in the same line subsequently operated and still another key in the same line subsequently operated thus providing what may be called a consecutive key-lock.

Upon the upper surface of the multicandidate keys, I place the beveled blocks, D', the shape of which is best shown in Figs. 7, 9 and 21. These blocks, D', coöperate with the sliding interlocking blocks, E', which are mounted in bearings, F', which will be subsequently described more in detail. Coiled expansion springs, G', are interposed between these bearings, F', and the blocks, E', so as to normally hold them to the right with their ends abutting against the adjoining block. When a key is pressed in, the beveled portion, D', forces all the blocks to the left of the key to the left by means of its beveled surface coöperating with the beveled end of the block, E', but as soon as the key is pushed in fully, the beveled portion, D', passes the blocks, E', and they fly back to the right, under stress of the springs, G', and lock the operated key in its innermost position.

It will further be seen that if an attempt should be made to operate two keys simultaneously the intervening blocks, E', would be prevented from movement and neither key could be operated. As soon as one key has been operated, another key can be operated, inasmuch as the blocks, E', are again in a position to be moved to the left. The extreme blocks, E', to the left are held in their position to the right by the leaf springs, H', best shown in Fig. 4, which take against pins, J', in the rear side of the block. Each block E' has pivotally mounted at its end a dog, K', which is yieldingly held to its work by the leaf spring, L', fastened to the outer face of the block and whose free end takes against the dog, K' as best seen in Fig. 21. Each of these dogs K', coöperates with a ratchet wheel, M', so as to advance said ratchet wheel one tooth at each operation of the blocks, E'. From this construction, it will be seen that every time a multicandidate key is pressed in, one of the ratchet wheels, M', will be moved forward one tooth.

Inasmuch as with the construction hitherto described it might be possible to press in two multicandidates keys simultaneously in different horizontal rows, it becomes necessary to make some provision for causing the movement of each of these ratchet wheels, M', to be registered upon the multicandidate locking device, no matter whether said ratchet wheels are actuated separately or together. For this purpose I employ the construction shown in Figs. 4, 5, 6, 7 and 21, which is mounted in what may be termed the additional casing, N'. These ratchet wheels, M', each have a sleeve, O', to which it is rigidly attached, and each sleeve has upon its other end a beveled gear wheel, P'. The sleeves, O', are supported in brackets, Q', and the inner sleeve, O', which is attached to the uppermost wheel, M', is mounted upon a rod or shaft, R', carried by the extreme brackets, Q'. The beveled gear wheel, P', corresponding to the uppermost wheel, M', is lowermost, and the sleeve, O', corresponding to the middle wheel, M', surrounds the innermost sleeve, O'. Similarly the outermost sleeve, O', surrounds the middle sleeve, O', and has attached to it the lowermost wheel, M', and the uppermost beveled gear wheel, P'. Between the two lower gear wheels, P', is mounted upon elongated bearings another beveled gear wheel, S', which carries a small beveled gear wheel, T', eccentrically mounted therein at right angles to the axis of the wheel, S', and meshing with the two lower beveled gear wheels, P'. A similar wheel, S', is mounted between the uppermost wheel, P', and a fixed beveled gear plate U', which becomes necessary on account of the uneven number of wheels, M', that are employed. The beveled gear wheels, S′, mesh with a beveled gear wheel, V′, similar to the wheel, T′, and mounted in a disk, W′, which is journaled upon the inner sleeve, O′. A spiral spring, X′, is fastened at one end to the casing, N′, and at the other end to the disk, W′, which it tends to turn from the right over to the left. A fixed pin, Y′ projecting upward from the surface, W′, and an adjustable pin, A², also projecting upward from said disk, coöperate with a stop lug, B², fastened to the casing, N′, and projecting into the path of these pins. A series of detent pawls, C², pivoted to the under side of brackets, D², as best seen in Figs. 6 and 21, coöperate with the teeth of the ratchet wheels, M′, to hold them in whatever position they may be advanced to by the action of the pawls, K′. A series of pins, E², one projecting upward from the surface of each of the wheels, M′, coöperate with a series of stop pieces, F², fastened to the upper surfaces of the central brackets, Q′.

The operation of the mechanism just described is as follows: At the beginning of the balloting, the detent pawls, C², will have previously been momentarily released from the ratchet wheels, M′, and the force of the spring, X′, will have been exerted to throw the ratchet wheels, M′, into the position shown in Fig. 5, with the pins E², resting against the stop pieces, F². Inasmuch as the beveled gear wheels, P′, are rigidly connected to the ratchet wheels, M′, the spring, X′, acting through the train of gearing, V′, S′, T′, etc., will cause this movement to the normal position, and in this normal position, further movement of the disk, W′, is prevented by reason of the pin, Y′, taking against the stop lug, B². If now any multicandidate key be pushed in, the movement of the blocks, E′, to the left thereof by said key will cause the dog, K′, in that horizontal row to move the ratchet wheel, M′, corresponding thereto, forward one tooth, where it will be caught by its dog, C², and retained. The movement of the ratchet wheel, M′, carries with it its beveled gear wheel, P′, and that by means of the beveled gear wheels, T′, S′, and V′, serves to advance the disk, W′, from the left over to the right a certain space, or what may be called a unit distance. The locking blocks, E′, prevent the simultaneous actuation of two keys in the same horizontal row, but if two keys are actuated simultaneously in different horizontal rows, the action of these keys upon their ratchet wheels, M′, will take place just the same as if they had been actuated separately, and when the requisite number of keys have been pressed in, in this instance three, the disk, W′, will have been advanced from the left over to the right far enough to bring the pin, A², in contact with the lug, B², so as to prevent any further operation of the device. When the device has been operated up to its limit, if a key be pressed in subsequently, in forcing the blocks, E′, to the left, the dog, K′, will be jammed into the teeth of the wheel, M′, and a complete movement of the key will be prevented.

As under some circumstances, it will be desirable to prevent the simultaneous operation of the two multicandidate keys in different horizontal rows, I may provide a frame, G², shown in perspective in Fig. 20, and which consists of the horizontal cross pieces, H², connected by the vertical cross pieces, J², held in position by reason of the ends of the cross pieces, H², taking into slots in the rear side of the casing, N′, and into slots formed in the front side of said casing, and in the piece, K², which is placed upon the rear of the front side of said casing in order to make deeper slots possible. A coiled spring, L², fastened to the cross piece, J², and to the front of the casing, N′, serves to hold the frame, G², in a forward position. Centrally located in the cross pieces, H², are the lower solid bearing pieces, M², and the central hollow bearing pieces, N², and the topmost hollow bearing piece, O², which is elongated and closed at the top so that a spring, P² (see Fig. 4), may be interposed between the top of the piece, O², and the topmost interlocking block, Q², which blocks are placed in said bearings in the manner shown. These interlocking blocks, Q², are similar to the interlocking blocks, E′, only they are placed vertically instead of horizontally, and they are separated by the beveled ends, R², of the blocks, E′, at the extreme left. It will be seen that by the employment of this frame, G², and the interlocking blocks, Q², I am enabled to prevent the simultaneous depression of two or more keys in different horizontal rows, if for any reason it is desired to construct the machine in this manner.

The straight ticket levers, C, project outwardly through the slots, D, and are secured at their inner ends to the vertically disposed rock shafts, R², which are mounted in bearings in the top and bottom of the casing. Each rock shaft, R², has a series of arms, S², of a somewhat peculiar shape, as shown in Figs. 5, 6, 7, 9, 23 and 24. These arms, S², have their broadened ends formed in a curved flange, T², whose lower end, in its normal position, rests just back of the outer end of the arm, V. When any of the rock shafts, R², are swung on their pivots, the arms, S², move rearwardly and the curved flanges, T², force the sleeves, K, inwardly, carrying therewith the keys, B, and the inward movement of the sleeve, K, coöperating with the lug, O, causes these sleeves to rotate in the customary manner. The flange, T², is sufficiently curved so that as the arm, V, turns upward, this flange follows it, still preserving its bearing against it, and when the flange reaches its innermost position, the sleeve, K, and the key, B, have been carried in their complete distance, and the arm, V, is contacted with by the extreme upper portion of the flange, $T^2$, which then rests substantially over the axis of the key. If desired, I may employ springs to return the rock shafts, $R^2$, to their normal position, instead of depending upon the voter to do so. It will be readily seen that the operation of any straight ticket key will move in all the keys of that party unless the candidate from some other party has been previously voted for for any particular office, in which case, the arm, V, of that particular party's candidate's key for that office will have been swung upward and out of the path of the arm, $S^2$, through the action of the link Y, so that that particular candidate is not voted for by actuation of his party's straight ticket device. Moreover if the straight ticket device has been operated before any other candidates have been voted for and it is desired to scratch any particular candidate, it will readily be seen that the pressing in of the candidate's key will (through the action of the rope S) throw out the key for the candidate for the same office that has been operated by the straight ticket voting, except in the multi-candidate group.

In case I employ the supplemental interlocking frame, shown in Fig. 20, it becomes necessary to move said frame out of operation before actuating the straight ticket mechanism, as otherwise the outer blocks, E', would catch the locking blocks, $Q^2$, and prevent the operation of the device by jamming. To obviate this difficulty, I provide the arms, $U^2$, (see Figs. 4, 5 and 7) on each of the rock shafts, $R^2$, the ends of which arms project through the horizontal slots, $V^2$, in the partition, E, and take against the vertical pins, $W^2$, which project upward from the sliding bar, $X^2$, which is suitably mounted in bearings, $Y^2$, on the front of the partition, E, and terminates in a beveled end, $Z^2$, (see Fig. 6) inside of the casing, N'. As any of the straight ticket levers are operated, it will be seen that the sliding bar, $X^2$, will be moved to the left, and its beveled end, $Z^2$, taking against the rear vertical cross piece, $J^2$, will carry the frame, $G^2$, to the rear so as to move the locking blocks, $Q^2$, out of the path of the end blocks, E'. This movement of the frame, $G^2$, of course takes place at the beginning of the operation of the straight ticket levers, and before the interlocking blocks, $Q^2$, are reached by the end blocks, E'. A spring, $A^3$, is fastened to the sliding bar, $X^2$, and to the casing, E, to hold said bar normally to the right.

The registers, see Figs. 10 to 12, consist of the small rectangular casings, $B^3$, which have the shafts, $C^3$, journaled in the front and rear walls of the casings. These shafts carry, rigidly fastened thereon, the ten toothed disks, $D^3$, and the indicating disks, $E^3$, which are marked with the digits from one to nine and zero in the customary manner. The disks, $D^3$, are placed in different planes, and the units and tens disks are provided with lugs, $F^3$, which project into the plane of the teeth of the tens and hundreds disks, respectively, and carry the tens and hundreds in the customary manner. A stepped plate, $G^3$, is placed across the casing, and forms an additional bearing for the shafts, $C^3$, and also serves to hold the curved plate friction springs, $H^3$, against the disks, $D^3$, so as to prevent any accidental movement thereof. One of the numerals from each disk shows through the apertures, $J^3$, in the rear wall of the casing, $B^3$. The disk, $D^3$, of the units wheel has a portion thereof projecting out through a slot, $K^3$, in the end of the casing, and one of the teeth of the disk, $D^3$, projects out far enough to strike the rectangular head, X, in the manner subsequently referred to. A small curved leaf spring, $L^3$, coöperates with the teeth of the units disk, $D^3$, to position it, and similar springs are preferably employed in connection with the tens and hundreds disks, $D^3$. These registers are fastened, as shown in Figs. 5, 6, and 7, to the inner side of the movable back, $M^3$, of the casing, and are retained in position and spaced apart by the vertical strips, $N^3$, and the horizontal strips, $O^3$, the back plate of the casing and the strips forming a movable frame carrying the registers. These strips do not extend out the entire depth of the register casing, and consequently the strips and the register casings together form a series of vertical and horizontal channels and the teeth of the units disk, $D^3$, project into the vertical channels. The movable casing has fastened to its back piece, $M^3$, the side pieces, $P^3$ and $Q^3$, on the left and right hand ends, respectively, and the movable casing is connected to the fixed casing by the four pairs of pivoted links, $R^3$, best shown in Figs. 2 and 3, which links are, as will be seen, fastened to the fixed and movable casings, respectively. The side pieces, $P^3$ and $Q^3$, have arranged therein, the L-shaped slots, $S^3$, into which pass the friction rollers, $T^3$, mounted upon the partition, E, at the right hand end and upon the right hand wall of the supplemental casing, N', at the other end. These friction rollers, $T^3$, coöperating with the slots, $S^3$, serve as a guide to the movement of the movable portion of the casing in the operation of the machine. A handle, $U^3$, is fastened to the rear wall, $M^3$, of the movable casing and after the voter has manipulated the keys and left the booth, the proper official operates the movable casing by means of this handle. From the shape of the slots, S³, it will be seen that the first movement is upward for a distance of about one half an inch, and then forward for a distance of about an inch, which completes the positive movement, when the reverse movement of an inch to the rear and a half an inch downward will take place. During this movement, the rectangular heads, X, of the arms, W, of any keys that may have been pushed in, are contacted with by the projecting teeth on the disks, D³, so as to move said disks a space of one tooth and thus register one vote upon each register for which the key has been pushed in. This registration takes place during the upward movement, the head X before the movement occupying the relative position shown in dotted lines, and at the end of the movement, the position shown in full lines in Fig. 10, so that the registration is completed at that time and the rest of the movement can be devoted to re-setting the machine. This re-setting action takes place as follows: During the positive movement forward, the rectangular head, X, of the keys that have been moved to operative position being in contact with the vertical strips, N³, the keys are pushed directly backward, the grooves, A', in the sleeve, K, passing by the lug, O. The close of the positive movement of the re-setting mechanism, therefore, leaves the keys, that have been operated, pushed in, but with their sleeves turned to the operated position. In order to move these sleeves to their unoperated position, I provide the following mechanism best shown in Figs. 5, 6, 7, 19 and 22 to 24: Mounted on each of the keys in the left hand vertical column just to the rear of the partition, E, is a sleeve, V³, which has an arm, W³, projecting downwardly to the left at an angle of 45°. Each of these arms, W³, is pivotally connected to the vertical bar, X³, and each sleeve has a pin, Y³, projecting into the plane of the arm, V, when the key is in its unoperated position, and so located that when the key is unoperated, but with the sleeve K turned as it is before the resetting is completed, the arm, V, will rest against this pin, Y³, as seen in dotted lines in Fig. 24, so that when the bar, X³, is raised upward and the sleeves, V³, thereby rocked through an angle of 90°, the pins, Y³, will move all the sleeves, K, of this row to their normal position, and the necessary movement of the links, Y, will thus move the sleeves, K, of the keys all over the machine to their normal position.

This upward movement of the bar, X³, takes place during the rearward movement of the movable casing, and is effected by means of the pivoted arm, Z³, see Figs. 5, 6, 7, and 19, which movable arm Z³, is pivoted to the inside of the wall, P³, and rests upon a lug, A⁴, and coöperates with the friction roller, B⁴, which is mounted on an arm, C⁴, projecting from the lower rear end of the bar, X³. The relative position and operation of these parts is illustrated in Fig. 19, where the normal position of the parts is shown in full lines, while the position at the end of the upward movement is shown in dotted lines, from which it will be observed that during the forward movement, the roller, B⁴, is stationary, and the arm, Z³, trips over it. At the end of the forward movement and when the arm returns, it will be seen that the upper surface of this arm will then take against the roller, B⁴, and acting thereon as a cam will raise the roller and the bar, X³, to the position shown in dotted lines, and then allow it to fall back to its normal position. During this re-setting operation, some effect must necessarily be produced upon the multicandidate mechanism. In the first place, the pawls, C², which are normally held in contact with the ratchet wheels, M', by the leaf springs, D⁴, (shown in dotted lines in Fig. 6) must be released from the ratchet wheels, M', in order to allow the multicandidate stop mechanism to return to initial position so as to set itself for another operation, and this I effect by having the lugs, E⁴, on the forward end of the side, P³, to take into the apertures, F⁴, in the left hand end of the partition, E, and into which apertures the ends of the dogs, C², enter. The position of the lugs E⁴ at the instant of releasing the dogs C² is indicated in Fig. 21 in dotted lines. Moreover, in this re-setting operation, it is necessary to release the multicandidate keys from their operative position in which they are detained by the blocks, E', and to effect this, I provide means for moving the blocks, E', and their supports, F', upward with the upward movement of the movable casing. To accomplish this result, I fasten the supports, F', which are preferably formed in the shape shown in Fig. 9, by being bent up from metallic straps, upon the rods, G⁴, which are supported by the rear plate, M³, and guided by the partition, E. These rods, G⁴, have pins, H⁴, passing therethrough on either side of the partition, E, so as to prevent any forward movement of the rod, G⁴, while permitting their limited upward and downward movement by reason of the vertical slots, J⁴, best shown in Fig. 4, in the partition, E. These rods pass freely through apertures in the rear casing, M³, which permit of their longitudinal movement through said casing. When the casing is moved, the first movement is to lift up the rods, G⁴, and this carries the holders, F', and the blocks, E', up out of the path of the blocks, D', and they remain up during the forward and backward movement of the casing, only returning into their normal position at the final downward movement of the casing after everything has been re-set. The rods, $G^4$, carrying the blocks, $E'$, to the extreme left, are shaped somewhat differently from the others, as shown in Fig. 6, and the slots in the case, $N'$, through which these blocks, $E'$, pass are elongated to permit of this vertical movement of the block. During the forward and backward movements of the casing, the rods, $G^4$, remain in their raised position, while the plate, $M^3$, slides thereover. The blocks, $E'$, upon the right hand side take against the elongated abutting piece, $K^4$, best shown in Fig. 4. It will be readily apparent that the movement of the register carrying frame by its action in returning all the keys to their normal unoperated position arranges the locking mechanism (whether the single candidate or the multicandidate locking mechanism be considered) in position to permit of another operation of the keys and the machine by another voter.

It is sometimes desirable to provide means for locking out all but a certain set of registers for the use of persons of a limited franchise. For instance in the State of Illinois, the women have the privilege of voting for the trustees of the State University, and I have shown my invention as arranged to lock out all the other registers when the machine is to be operated by a woman. This is effected by means of the small vertical rod, $L^4$, which is journaled in the top and bottom of the casing, which has small arms, $M^4$, corresponding to all the offices except the trustees, and which normally lie parallel to the partition, $E$, as shown in Figs. 5 and 6, but which can be turned to an angle of 90° by reason of the crank, $N^4$, at the top of said rod, and in this adjusted position, the arms, $M^4$, will take over the arms, $V$, of that particular column of registers, and thus prevent the operation of any registers in the machine, except those used for the university trustees.

As previously stated, it is desirable to provide means for insuring the operation of the register devoted to any member of a group of candidates when said person is voted for as president of the board to which the group is devoted. This may be accomplished in a variety of ways, but I conveniently accomplish it, as shown in Figs. 1, 2, and 3, by affixing to the outer end of the keys devoted to the presidents of the board, a downwardly projecting plate, $O^4$, which laps over the key for the trustee immediately beneath it, which trustee is supposed to be the same as the one for the presidents of the board, so that when the key is operated for the president, it is necessary to operate the corresponding register for the person as a member of the board. By this construction, however, it will be seen that it is impossible to vote for any candidate as a member of the board, and not vote for him as president.

In addition to the regular balloting mechanism heretofore described, I employ irregular balloting mechanism by which a vote may be cast for any candidate for any office who is not regularly nominated by any party so that his name appears on the ballot. The keys, $B$, of the vertical row to the right are substantially the same as the other keys, with the exception that they do not operate any register, but the actuation of any key in this row serves to set a ballot receptacle so that a card, upon which the name of the person for whom an irregular ballot is to be cast is written, may be inserted in such receptacle, or placed so that it will be fed into the receptacle by the subsequent operation of the machine. In the front wall, $A$, to the right of the keys and a little below them are placed the longitudinal apertures, $P^4$, which open into a passage way of the same size between the plates, $A$ and $E$, conveniently formed by the horizontal plates, $Q^4$, and placed therein for this purpose and fastened to the plates, $A$ and $E$. The passage way is prolonged by an aperture, $R^4$, through the plate, $E$, and terminates in the additional passage way formed by the plates, $S^4$, placed between the parallel walls, $T^4$ and $U^4$, which extend rearwardly from the plate, $E$, and parallel to the side wall, $Q^3$. Journaled in these walls, $T^4$ and $U^4$, are a series of feed rollers, which are best shown in Figs. 8, 13, 14, and 15. The upper one of these feed rollers is illustrated in detail in Figs. 13, 14, and 15, and consists of a hollow roller, $V^4$, having a flat surface, $W^4$, which is normally on the under side of the roller. This roller is mounted on a rod, $X^4$, which may be splined to the roller, but which I preferably make square in cross section, so that the turning of the rod will rotate the roller. A coiled spring, $Y^4$, is connected to the rod, $X^4$, and to the interior of the roller, $V^4$, so as to normally hold the rod, $X^4$, in the position shown in full lines in Fig. 13. The roller, $V^4$, has fastened thereto the bearings, $Z^4$, in the walls, $T^4$ and $U^4$. The rod, $X^4$, terminates in a head, $A^5$, which is preferably shaped like a short frustum of a cone, and when the key, $B$, is pushed in, the end of the sleeve, $K$, takes against said head, $A^5$, and slides the rod, $X^4$, to the right against the resistance of the spring, $Y^4$, and into the position shown in dotted lines in Fig. 13. The bearing, $Z^4$, in the wall, $U^4$, and through that the roller, $V^4$, has rigidly connected thereto the gear wheel, $B^5$, which rotates with the roller, $V^4$. The right hand end of the rod, $X^4$, has rigidly fastened thereto a gear pinion, $C^5$, which is of much less diameter than the gear wheel, $B^5$. The roller, $V^4$, has pivoted therein, on a rod, $D^5$, the lugs, E⁵, which normally hang downward, as shown in Figs. 14 and 15, so as to partially close the passage way formed by the flat surface, W⁴, of the roller, V⁴, and the flat surface, F⁵, of the lower roller, G⁵. This lower roller, G⁵, is a solid roller and is journaled in the walls, T⁴ and U⁴, in the customary manner, and has at its right hand end, outside of the wall, U⁴, the gear wheel, H⁵, which meshes with the gear wheel, B⁵. From the construction thus far explained, it will be seen that if the small gear pinion, C⁵, is rotated, it will cause the rollers, V⁴ and G⁵, which are preferably faced with rubber or have a roughened surface, to rotate so as to carry between them and feed into the machine any card which may have been pushed into the passage way and between the rollers. The card is designed to be of a length corresponding to the entire length of the passage way, and of such a thickness as to prevent the insertion of more than one card at a time. The lugs, E⁵, are designed to prevent a card being thrust into the machine without its being carried in by the rollers, as such an operation will permit of a fraud upon the machine. To actuate the gear pinion, C⁵, I provide an L-shaped rack, J⁵, best shown in Figs. 8 and 25, which is fastened to the inside of the wall, Q³, as shown in Figs. 6 and 7. The pinion, C⁵, does not normally rest in the path of the rack, J⁵, but when its key, B, has been pushed in, the pinion, C⁵, is carried into the path of the rack, J⁵. It will be seen that as the re-setting mechanism is operated the rack, J⁵, will be carried up and forward, thus rotating the rollers, V⁴ and G⁵, so as to carry through them the ballot which has been placed between them. In order to prevent the disengagement of the pinion, C⁵, and the rack, J⁵, during the backward movement of the re-setting mechanism after the key, B, has been returned partially to position so that its end will not hold the rod, X⁴, to the right, I employ a flange, K⁵, corresponding in shape to the rack, J⁵, and so arranged as to take over the inner edge of the pinion, C⁵, and hold it in its right hand position until it returns to its initial position where the flange, K⁵, does not overlap the tooth of the rack, J⁵, and where the rod, X⁴, is permitted under the stress of the spring, Y⁴, to return to its normal position. To receive the ballots which have been fed through this mechanism, I provide the casing, L⁵, which has a series of slanting partitions, M⁵, thus forming a series of pockets, N⁵, one for each irregular balloting mechanism. These pockets, N⁵, have doors, O⁵, at their rear, which are hinged to the casing, and which are secured in their closed position by means of locks, P⁵, the keys of which will be in the hands of the election commissioners. When an election is closed and the registers are read through suitable apertures in the back plate of the casing, these doors, O⁵, will be opened, and the irregular ballots therein counted for the candidates whose names they bear.

It will be seen that in an invention of this character, the construction may be varied widely, and that I do not desire to be limited to the exact construction shown and described, but only to such constructions as are necessitated by the terms of the following claims.

I claim—

1. In a voting machine, the combination of candidate keys grouped according to offices and according to parties, with means for moving to their operative position all the keys devoted to any party at one operation, and connections whereby any key moved to its operative position by the voter subsequently to the straight party operation will return the previously moved key for the same office and cancel its effect.

2. In a voting machine, the combination of a series of candidate keys devoted to a single office, counters for said keys, said keys being freely movable into and out of operative position without operating the counters, connections between the keys whereby the operated key will be placed in inoperative position by the subsequent operation of another key in the same office line by the same voter, and means for simultaneously operating the counters whose keys are in voted position.

3. In a voting machine, the combination of candidate keys grouped according to offices and according to parties, with means for moving to their operative position all the keys devoted to any party at one operation, except such keys as are in office groups in which the voter has previously moved another key, and connections whereby any key moved to its operative position by the voter subsequently to the straight party operation will return the previously moved key for the same office and cancel its effect.

4. In a voting machine, the combination of two series of ballot indicating devices with connections whereby one of the devices of one of said series must be moved for operation before any of the devices of the second series may be operated.

5. In a voting machine, the combination of a series of ballot indicating devices, with other series of ballot indicating devices and connections between each device of said first series with one of the devices of said other series, whereby when one of said first series is moved for operation, it will necessitate its connected device being moved for operation.

6. In a voting machine, the combination of a series of ballot indicating devices for candidates for an office to which a plurality of candidates are to be chosen, grouped according to parties, with connections for actuating said devices singly and permitting the actuation of but one of said devices at a time, and means for actuating the devices for all of the candidates of any of the parties simultaneously.

7. In a voting machine, the combination of a series of keys arranged in groups, with means for preventing the simultaneous operation of any of said keys, and additional mechanism for operating all of the keys of one of said groups simultaneously.

8. In a voting machine, the combination of a series of keys, with a multicandidate device actuated one step for each key operated, whether said keys are actuated *seriatim* or simultaneously.

9. In a voting machine, the combination of plural series of ballot indicating devices, grouped according to offices and parties, with means for compelling the operation of said devices *seriatim*, if candidates are selected individually, but permitting them to be operated simultaneously as to parties.

10. In a voting machine, the combination of candidate keys grouped according to offices and according to parties, with means for moving to their operative position all the keys devoted to any party at one operation, except such keys as are in office-groups in which the voter has moved another key, and connections whereby the moving of any key to its operative position by the voter subsequently to the straight-party operation will necessitate the return of the previously moved key for the same office and cancel its effect.

11. In a voting machine, the combination, with a series of candidate registers, of plural series of ballot indicating keys, grouped according to parties and according to offices, one key for each register, freely movable into and out of operative relation with their corresponding registers, interlocking devices between the keys of each office group to prevent the operation of more than a predetermined number of keys in each such group, straight ticket mechanism for simultaneously moving all the keys in any party group to operative position, and means for operating all the registers whose keys are set for operation subsequently to the setting of said keys.

12. In a voting machine, the combination, with a series of candidate registers, of plural series of ballot indicating keys, grouped according to parties and according to offices, one key for each register, freely movable into and out of coöperative relation with their corresponding registers, interlocking devices between the keys of each office group to prevent the operation of more than a predetermined number of keys in each such group, a straight ticket indicating key for each party group for moving all the keys in its group to operative position, and means for operating all of the registers whose keys are set for operation subsequently to the setting of the keys.

13. In a voting machine, registering mechanisms, independent locking mechanisms, and an edgewise movable frame independently mounted in which said registering mechanisms are supported which actuates the registers and arranges the locking mechanisms to permit of another operation.

14. In a voting machine, registering mechanisms, independent locking mechanisms, and a movable frame independently mounted in which said registering mechanisms are supported, the movement of the frame first operating the registers and then arranging the locking mechanisms to permit of another operation.

15. In a voting machine, registering mechanisms, independent locking mechanisms, and a movable frame independently mounted and carrying the registers, the movement of the frame first operating the registers and then arranging the locking mechanisms to permit of another operation.

16. In a voting machine, the combination with plural series of registering mechanisms adapted for arrangement in party and office groups, of selecting mechanism for indicating the candidates chosen, interlocking mechanism for preventing the operation of more registers than the number of offices to be filled, and a movable frame for supporting said registers, the movement of which first operates the registers, and then arranges the interlocking mechanisms to permit of another operation.

17. In a voting machine, the combination with plural series of registering mechanisms adapted for arrangement in party and office groups, of selecting mechanism for indicating the candidates selected, said selecting mechanisms being freely movable into and out of any desired arrangement prior to the actuation of the registering mechanisms, interlocking mechanism for preventing the operation of more registers than the number of offices to be filled, and a movable frame, the movement of which first operates the registers and then arranges the interlocking mechanism to permit of another operation.

18. In a voting machine, the combination with plural series of registering mechanisms adapted for arrangement in party and office groups, of selecting mechanism for indicating the candidates selected, interlocking mechanism for preventing the operation of more registers than the number of offices to be filled, and a movable frame carrying the registers, the movement of which first operates the registers and then arranges the interlocking mechanism to permit of another operation.

19. In a voting machine, the combination with the face plate, of a series of keys mounted therein to be moved freely from operative to inoperative position and vice versa, a portion of each of said keys within the machine being swung about its axis from inoperative to operative position as the key is moved to set it, interlocking mechanism connected with said keys to prevent the simultaneous operation of more than a predetermined number, a movable frame carrying a corresponding series of registers, and means for moving the frame to actuate the registers by reason of their contacting with the rotated portions of the operated keys.

20. In a voting machine, the combination with the face plate, of a series of keys mounted therein arranged in transverse party and office rows, a portion of each of said keys within the machine being swung about its axis from inoperative to operative position as the key is moved to set it, interlocking mechanism connected with said keys to prevent the simultaneous operation of more than a predetermined number in each office group, straight-ticket mechanism adapted as it is operated to engage the portions of all of said keys within the casing and swing them into operative position, a movable frame carrying a corresponding series of registers, and means for moving the frame to actuate the registers by reason of their contacting with the rotated portions of the operated keys.

21. In a voting machine, the combination with the face plate, of a series of keys mounted therein, arranged in transverse party and office rows, and adapted to be moved freely from operative to inoperative position and vice versa, a portion of each of said keys within the machine being swung about its axis from inoperative to operative position as the key is moved to set it, interlocking mechanism connected with said keys to prevent the simultaneous operation of more than a predetermined number in each office group, a straight-ticket mechanism for each party row adapted as it is operated to engage the portions of said keys of that row within the casing and swing them into operative position, a movable frame carrying a corresponding series of registers, and means for moving the frame to actuate the registers by reason of their contacting with the rotated portions of the operated keys.

22. In a voting machine, the combination with the face plate, of a series of keys mounted therein, each having a portion outside of the face plate to be manually operated and a portion within the face plate adapted to be turned about its axis when the key is moved from operative to inoperative position, interlocking mechanism between said keys adapted to prevent the simultaneous operation of more than a predetermined number, and a movable frame carrying a corresponding series of registers adapted to be engaged and operated as the frame is moved by the inner portions of such keys as are turned.

23. In a voting machine, the combination with the face plate, of a series of keys mounted therein arranged in transverse party and office rows, and each key having a portion outside of the face plate to be manually operated and a portion within the face plate adapted to be turned about its axis when the key is moved from operative to inoperative position, interlocking mechanism between said keys adapted to prevent the simultaneous operation of more than a predetermined number in each office group, a straight-ticket mechanism for each party row adapted as it is operated to engage the portions of said keys of that row within the casing and swing them into operative position, and a movable frame carrying a corresponding series of registers adapted to be engaged and operated as the frame is moved by the inner portions of such keys as are turned.

24. In a voting machine, the combination with the face plate, of a series of keys mounted therein, each key having a portion outside of the face plate adapted to be reciprocated longitudinally and a portion within the face plate adapted to be turned about its axis when the key is moved from operative to inoperative position, interlocking mechanism between said keys adapted to prevent the simultaneous operation of more than a predetermined number, and a movable frame carrying a corresponding series of registers adapted to be engaged and operated by the inner portions of such keys as are turned as the frame is moved.

25. In a voting machine, the combination with the movable frame carrying a plurality of registers, of a face plate carrying a corresponding plurality of keys whose inner ends are turned about their axes as they are set to bring them into coöperative relation with their respective registers to operate the same as the frame is moved, interlocking mechanism to prevent the simultaneous operation of more than a predetermined number of said keys, and means for re-setting the operated keys after the registers are operated.

26. In a voting machine, the combination with a movable frame carrying a plurality of registers, of a face plate carrying a corresponding plurality of keys arranged in transverse party and office rows and whose inner ends are turned about their axes as they are set to bring them into coöperative relation with their respective registers to operate the same as the frame is moved, interlocking mechanism to prevent the simultaneous operation of more than a predetermined number of keys in each office group, straight-ticket mechanism for engaging the inner ends of the keys of any party row and simultaneously turning them to operative position, and means for re-setting the operated keys after the registers have been operated.

27. In a voting machine, the combination with a movable frame carrying a plurality of registers, of a face plate carrying individual selective mechanism for each candidate register, comprising a member within the casing which is turned about its axis as its mechanism is moved to bring it into coöperative relation with its respective register to operate the same as the frame is moved, interlocking mechanism between said selective mechanisms to prevent the simultaneous operation of more than a predetermined number, and means for re-setting the mechanism after the registers are operated.

28. In a voting machine, the combination with a movable frame carrying a plurality of registers, of a face plate carrying a corresponding plurality of individual selective mechanisms arranged in transverse party and office rows, and each comprising a member within the casing which is turned about its axis to bring it into coöperative relation with its register to operate the same as the frame is moved, interlocking mechanism between said selective mechanisms to prevent the simultaneous operation of more than a predetermined number in each office group, straight-ticket mechanism for engaging and simultaneously turning the members of any party row to operative position, and means for re-setting the operated keys after the registers are operated.

29. In a voting machine, the combination of a consecutive key lock, a supporting frame therefor, an adjacent counter-frame, and means for simultaneously shifting both frames.

30. In a voting machine, the combination with a series of individual candidate selecting mechanisms, of a series of interlocking members moved by the actuation thereof, means for moving said members out of possible engagement with the mechanisms, and re-setting apparatus for returning the mechanisms while the members are moved out of possible engagement therewith.

31. In a voting machine, the combination with a series of individual candidate selecting mechanisms, of a movable frame carrying a series of interlocking members moved relative to the frame by the actuation thereof, means for moving said frame to carry said members out of possible engagement with the mechanisms, and re-setting apparatus for returning the mechanisms while the members are moved.

32. In a voting machine, the combination with a series of individual candidate selecting mechanisms, of a corresponding series of registers whose operation is controlled thereby, a series of interlocking members moved by the actuation of the selecting mechanisms, means for moving said members out of possible engagement with the mechanisms, and re-setting apparatus for first actuating the registers corresponding with the actuated selecting mechanisms and then returning said mechanisms while the interlocking members are moved out of possible engagement therewith.

33. In a voting machine, the combination with a series of individual candidate selecting mechanisms, of a corresponding series of registers the operation of which is controlled by said selecting mechanisms, a movable frame, a series of interlocking members carried by said frame and moved relatively thereto by the actuation of the candidate selecting mechanisms, means for moving said frame, and re-setting apparatus for first actuating the registers corresponding with the said selecting mechanisms and then returning said mechanisms while the frame is in its moved position to hold the interlocking members out of possible engagement therewith.

34. In a voting machine, the combination with a series of individual candidate selecting mechanisms, of a movable frame carrying a corresponding series of registers, a second frame carrying a series of interlocking members moved relatively to the frame by the operation of the selecting mechanisms, and means for first moving the register-carrying frame to actuate the registers corresponding to the said selecting mechanisms and then returning said selecting mechanisms while the frame carrying the interlocking members is moved out of its normal position.

35. In a voting machine, the combination with a plurality of voting mechanisms and vote-registering devices, of a vertical frame carrying the latter, guiding means for retaining said frame in a vertical position, and means for moving said frame bodily relative to the voting mechanisms, whereby the registering devices are brought into an operative relation with voting mechanisms and the indicated votes registered and the voting mechanisms then returned positively to normal position.

36. In a voting machine, the combination with a plurality of voting mechanisms and vote-registering devices, of a frame carrying the latter, guiding means for retaining said frame in a plane parallel to the voting mechanisms, and means for moving said frame bodily relative to the voting mechanisms, whereby the registering devices are brought into an operative relation with the voting mechanisms and the indicated votes registered and the voting mechanisms then returned positively to normal position.

37. In a voting machine, the combination with a plurality of voting mechanisms and vote-registering devices, of a frame carrying the latter, guiding means for retaining said frame in a plane parallel to the voting mechanisms, and means for moving said frame bodily in one direction relative to the voting mechanisms, whereby the registering devices are operated by the said voting mechanisms, and in another direction so that the said voting mechanisms will be returned to normal thereby.

38. In a voting machine, the combination with a plurality of voting mechanisms and vote-registering devices, of a vertical frame carrying the latter, guiding means for retaining said frame in a vertical position, and means for moving said frame horizontally relative to the voting mechanisms, whereby the registering devices are operated by the said voting mechanisms, and then vertically, so that the voting mechanisms will be returned thereby.

39. In a voting machine, the combination with the plurality of sliding keys including the rotary sleeves mounted thereon, of means for simultaneously engaging said keys to move them longitudinally and rotate their sleeves.

40. In a voting machine, the combination with the plurality of sliding keys including the rotary sleeves mounted thereon, of means for simultaneously rotating said sleeves.

41. In a voting machine, the combination with the plurality of sliding keys including the rotary sleeves mounted thereon, of means for simultaneously engaging the sleeves to move the keys longitudinally and rotate the sleeves.

42. In a voting machine, the combination with the plurality of sliding keys including the rotary sleeves mounted thereon and carrying an arm, of means for simultaneously engaging the arms of said sleeves to move the keys longitudinally and rotate the sleeves.

43. In a voting machine, the combination with the plurality of sliding keys including the rotary sleeves mounted thereon and provided with radial arms, of a rock-shaft carrying arms adapted to engage the arms on the sleeves and move the keys longitudinally and rotate the sleeves.

44. In a voting machine, the combination with the face plate, of a series of keys mounted therein each having a rotatable portion within said face plate consisting of a radial arm and an eccentric portion extending in the direction of the axis of the key, a corresponding series of registers, interlocking mechanism for preventing the simultaneous operation of more than the desired number of registers, and means for producing a relative movement of all the registers and keys to cause the actuation of the registers corresponding to the operated keys by reason of their engagement with the eccentric portions of the keys which are in their operated position.

45. In a voting machine, the combination with the face plate, of a series of keys mounted therein each having a rotatable portion within said face plate consisting of a radial arm and an eccentric portion extending in the direction of the axis of the key, a corresponding series of registers, interlocking mechanism for preventing the simultaneous operation of more than the desired number of registers, means for producing a relative movement of all the registers and keys to cause the actuation of the registers corresponding to the operated keys by reason of their engagement with the eccentric portions of the keys which are in their operated position, and means for resetting the keys after the operation of the registers.

46. In a voting machine, the combination with the face plate, of a series of keys mounted therein each having the rotatable portion within said face plate consisting of a radial arm and an eccentric portion extending in the direction of the axis of the key, interlocking mechanism for preventing the simultaneous operation of more than the desired number of registers, and means for moving all of the registers relative to the keys to cause the actuation of the registers corresponding to the operated keys by reason of their engagement with the eccentric portions of the keys which are in their operated position.

47. In a voting machine, the combination with the face-plate, of a series of keys mounted therein each having the rotatable portion within said face-plate consisting of a radial arm and an eccentric portion extending in the direction of the axis of the key, interlocking mechanism for preventing the simultaneous operation of more than the desired number of registers, means for moving all of the registers relative to the keys to cause the actuation of the register corresponding to the operated keys by reason of their engagement with the eccentric portions of the keys which are in their operated position, and means for resetting the keys after the operation of the registers.

48. In a voting machine, the combination with the face-plate, of a series of keys mounted therein each having a rotatable portion within said face plate consisting of a radial arm and an eccentric portion extending in the direction of the axis of the keys, a frame parallel to the face plate, a series of registers carried by said frame and corresponding to the keys, interlocking mechanism for preventing simultaneous operation of more than the desired number of registers, and means for moving the frame to thereby cause the actuation of the registers corresponding to the operated keys by reason of their engagement with the eccentric portion of the keys which are in their operated position.

49. In a voting machine, the combination with the face-plate, of a series of keys mounted therein arranged according to offices and according to parties and each having a rotatable portion within said face plate consisting of a radial arm and an eccentric portion extending in the direction of the axis of the key, a corresponding series of registers, interlocking mechanism for preventing the simultaneous operation of more than the desired number of registers, straight-ticket mechanism to engage the radial arms and thereby simultaneously operate all the registers of a party-group, and means for producing a relative movement of all the registers and keys to cause the actuation of the registers corresponding to the operated keys by reason of their engagement with the eccentric portion of the keys which may be in their operated position.

50. In a voting machine, the combination with the face-plate, of the series of keys mounted therein arranged according to offices and according to parties, each having a rotatable portion within said face plate consisting of a radial arm and an eccentric portion extending in the direction of the axis of the key, a corresponding series of registers, interlocking mechanism for preventing the simultaneous operation of more than the desired number of registers, straight ticket mechanism adapted to engage the radial arms and thereby simultaneously move all of the keys of a party-group into operated position, and means for moving all of the registers relative to the keys to cause the actuation of the registers corresponding to the operated keys by reason of their engagement with the eccentric portions of the keys in their operated position.

51. In a voting machine, the combination with the casing having selecting mechanism, such as candidate keys mounted therein, of the vertical frame carrying the registers corresponding to the keys and movable relative to the casing to operate the registers selected, links connected to the frame and to the casing, and the rollers and coöperating slotted members to control the movement of the frame relative to the casing.

52. In a voting machine, the combination with the casing having selecting mechanism, such as candidate keys, mounted therein and arranged according to offices and according to parties, of the vertical frame carrying the registers corresponding to the keys movable relative to the casing to operate the registers selected, interlocking mechanism to limit the number of registers that may be simultaneously operated in any office group, the links connected to the frame and to the casing, and the rollers and coöperating slotted members to control the movement of the frame relative to the casing.

53. In a voting machine, the combination with the casing having selecting mechanism, such as candidate keys, mounted therein and arranged according to offices and according to parties, straight ticket-mechanism for simultaneously moving all the keys of any chosen party-group, of a vertical frame carrying the registers corresponding to the keys movable relative to the casing to operate the registers selected, the links connected to the frame and to the casing, and the rollers and coöperating selected members to control the movement of the frame relative to the casing.

54. In a voting machine, the combination with the front plate having selecting mechanism, such as candidate keys, mounted therein, of the vertical frame carrying the registers corresponding to the keys, said registers having their units wheels adapted to be engaged directly by the operated keys, interlocking mechanism to prevent the simultaneous operation of more than the desired number of registers, and means for causing a relative movement of the keys and frame to cause the registration of the set keys to be operated thereby.

55. In a voting machine, the combination with the front plate having the selecting mechanism, such as candidate keys, mounted therein, of the vertical frame carrying the registers corresponding to the keys and movable relative to the front plate to operate the registers selected by reason of the keys directly engaging the units wheels of the registers, locking mechanism to prevent the simultaneous operation of more than the desired number of registers, links connected to the frame and to the casing containing the front plate, and the rollers and coöperating slotted members to control the movement of the frame relative to the casing.

56. In a voting machine, the combination with the casing having the front plate in which selecting mechanism, such as candidate keys, are mounted and arranged according to offices and according to parties, of the vertical frame carrying the registers corresponding to the keys and movable relative to the front plate to operate the registers by reason of the keys engaging directly with the units wheels of the registers, interlocking mechanism to limit the number of keys that may be operated in any office-group, links connected to the frame and to the casing, and the rollers and coöperating slotted members to control the movement of the frame relative to the casing.

57. In a voting machine, the combination with the casing having the front plate therein, with the selecting mechanism, such as candidate keys, mounted therein and arranged according to offices and according to parties, of the vertical frame carrying the registers corresponding to the keys and movable relative to the casing to operate the registers selected by reason of their units wheels engaging directly the operated keys, interlocking mechanism to limit the number of keys that may be operated, straight ticket mechanism for simultaneously moving all the keys of any chosen party-group, the links connected to the frame and to the casing, and the rollers and coöperating slotted members to control the movement of the frame relative to the casing.

58. In a voting machine, the combination with a front plate having selecting mechanism, such as candidate keys, mounted therein, of the registers supported in a frame-work parallel to the front plate and adapted to have their units wheels engaged directly by the coöperating keys which may be set, and means for re-setting the machine and thereby causing a relative movement of the keys and registers to operate the registers by the keys which were set.

59. In a voting machine, the combination with the front plate having selecting mechanism, such as candidate keys, mounted therein, of the registers supported in a frame work parallel to the front plate and adapted to have their units wheels engaged directly by the coöperating keys which may be set, interlocking mechanism to prevent the simultaneous operation of more than the desired number of registers, and means for re-setting the machine to cause the operation of the registers of the chosen candidates by their engagement with the set keys, and to return said set keys.

60. In a voting machine, the combination with a member rotatable step by step, of a plurality of keys, the movement of each of which causes the advance of said member a space whether the keys are moved simultaneously or *seriatim*, and connections between said keys and member.

61. In a voting machine, the combination with a rotatable group-limiting mechanism, movable step by step, of a plurality of keys, the movement of each of which causes the advance of said member a space whether the keys are moved simultaneously or *seratim*, and connections between the said keys and member, substantially as described.

62. In a voting machine, multi-candidate group mechanism comprising a one-way clutch member for each office row, means controlled by the actuation of a key in the row for advancing the clutch member, a common stop member, and connections between said clutch members and common stop member to prevent further advance of any of the clutch members when the common stop member has reached its limit of movement.

63. In a voting machine, multi-candidate-group mechanism comprising a one-way clutch member for each office row, means controlled by the actuation of a key in the row for advancing the one-way clutch member a step, a common stop member, a rotary member to which the common stop member is secured, bevel gears attached to the clutch member and serving as they are moved to advance the common stop members, and connections between said clutch member and common stop member to prevent the further advance of any of the clutch members when the common stop member has reached its limit of movement.

64. In a voting machine, the combination with a register, of a longitudinally movable key, a rotary sleeve thereon carrying a member adapted to engage and actuate the registers when the key is in operative position, and means for causing the relative movement of the register and the member to thereby actuate the registers.

65. In a voting machine, the combination with a register, of a longitudinally movable key, a rotary sleeve thereon carrying a member adapted to engage and actuate the register when the key is in operative position, and means for moving the register to cause it to be actuated by the member.

66. In a voting machine, the combination with a plurality of registers, of a corresponding plurality of longitudinally movable keys each having a rotary sleeve thereon carrying a member adapted to engage and actuate the corresponding registers when the key is in operative position, means for preventing the simultaneous actuation of more than the desired number of keys, and means for causing the relative movement of the registers and the keys to thereby actuate the registers.

67. In a voting machine, the combination with a series of registers, of the corresponding series of longitudinally movable keys each having a rotary sleeve mounted thereon and carrying a member adapted to engage and actuate the corresponding member when the key is in operative position, means for preventing the simultaneous operation of more than the desired number of registers, and means for simultaneously moving all of the registers to actuate those corresponding to the operated keys.

68. In a voting machine, the combination with a series of registers, of a corresponding series of movable keys, a rotary sleeve on each key carrying a member adapted to engage and actuate the corresponding registers when the key is in operative position, and means connecting all of said sleeves to cause their simultaneous rotation.

69. In a voting machine, the combination with a series of registers, of a corresponding series of longitudinally movable keys, a rotary sleeve on each key carrying a member adapted to engage and actuate the corresponding registers when the key is in operative position, and means connecting all of said sleeves to cause their simultaneous rotation, said means consisting of a link connecting the eccentric arms carried by said sleeves.

70. In a voting machine, a reciprocating re-setting member, a projection carried thereby, and a transversely movable swinging lug having a cam surface adapted to engage the projection to move it in one direction, and to swing over it in the other direction.

71. In a voting machine, a reciprocating re-setting member, an anti-friction roller carried thereby, and a transversely movable swinging lug having a cam surface adapted to engage the roller to move it in one direction, and to swing over it in the other.

72. In a voting machine, the combination with the sliding key, of the rotary sleeve thereon having a helical groove therein, and a projection adapted to enter the groove to cause the rotation of the sleeve as the key is operated.

73. In a voting machine, the combination with the plurality of sliding keys, each having a rotary sleeve thereon having a helical groove therein, projections adapted to enter the grooves to cause the rotation of the sleeves as the keys are operated, and interlocking mechanism between said keys to prevent the simultaneous operation of more than the desired number.

74. In a voting machine, the combination with a plurality of sliding keys, each having the rotary sleeve thereon provided with a helical groove therein, of a corresponding plurality of tallying mechanisms whose operations is controlled by said keys, interlocking mechanism to prevent the simultaneous operation of more than the desired number of keys, and projections adapted to enter the grooves to cause the rotation of the sleeves as the keys are operated.

75. In a voting machine, the combination with the registers grouped according to offices, of the keys coöperating therewith, interlocking mechanism to prevent the operation at one time of more than the required number of registers in any group, a member carried by and moving with each key and engaging the units wheel of the coöperating register to advance it one unit as the machine is reset, and means for re-setting the machine.

76. In a voting machine, the combination with the registers grouped according to offices, of the keys coöperating therewith, interlocking mechanism to prevent the simultaneous operation of more than the required number of keys of any group, a member carried by and moving with each key and engaging the units wheel of the coöperating register to advance it one unit as the machine is reset, and means for resetting the machine.

77. In a voting machine, the combination with the registers grouped according to offices, of the keys coöperating therewith, interlocking mechanism to prevent the operation at one time of more than the required number of registers in any group, a member carried by each key and moving therewith and engaging the units wheel of the corresponding register to actuate it as the machine is reset, and means for resetting the machine.

78. In a voting machine, the combination with the registers, of the keys adapted to control the operation of their respective registers, straight ticket mechanism for moving all the keys of the party-group to operative position, and means for previously moving any key so that it will not be moved by its straight ticket mechanism as the latter is operated.

79. In a voting machine, the combination with the registers, of the keys adapted to control the operation of their respective registers, straight ticket mechanism for moving all the keys of a party-group to operative position, and a member on each key normally in position to be engaged by a straight ticket mechanism and adapted to be moved out of possible engagement therewith when desired.

80. In a voting machine, the combination with the registers, of the keys adapted to control the operation of their respective registers, straight ticket mechanism for moving all the keys of a party group to operative position, a member on each key normally in position to be engaged by a straight ticket mechanism, and means for moving said member to take it out of possible engagement with the straight ticket mechanism.

81. In a voting machine, the combination with the registers, of the keys adapted to control the operation of their respective registers, straight ticket mechanism for moving all of the keys of a party-group to operative position, and a rotary member on each key normally in position to be engaged by its straight ticket mechanism, and adapted to be moved out of possible engagement therewith when desired.

82. In a voting machine, the combination with the registers, of the keys adapted to control the operation of their respective registers, straight ticket mechanism for moving all of the keys of a party-group to operative position, and a rotatable member on each key adapted to be engaged by the straight ticket mechanism in its normal position, but not in its abnormal position.

83. In a voting machine, the combination with the keys arranged in party columns and office rows, of means for engaging and simultaneously operating all the keys of any party column except such as have been rendered inoperative by previously operating a key for another candidate in the same office row, such previously scratched keys not being engaged by said means.

84. In a voting machine, the combination with the keys arranged in party columns and office rows, of means for engaging and simultaneously operating all the keys in any party column except such as have been previously affected to prevent their operation thereby, such previously affected keys not being engaged by said means, and means for resetting the keys and automatically returning all of the keys to their normal position.

85. In a voting machine, the combination with a plural series of ballot indicating devices, such as keys, of corresponding series of ballot registering mechanisms, the operation of which is controlled by the position of the corresponding ballot indicating devices, mechanism for limiting the number of the ballot indicating devices that may be simultaneously moved to operative position, connections between the ballot indicating devices of two of said series, whereby one of the ballot indicating devices of one of said series must be moved to operative position before any of the ballot indicating devices in the other series may be moved to operative position, and means for operating all of the ballot registering mechanisms whose ballot indicating devices are in operative position.

86. In a voting machine, the combination with the ballot indicating devices movable into and out of operative position, of the corresponding ballot registering mechanisms, means for moving said ballot indicating devices and ballot registering mechanisms relatively to first operate such ballot registering mechanisms as have their ballot indicating devices moved to operative position, and subsequently to return the ballot indicating devices to unoperated position.

87. In a voting machine, the combination with ballot indicating devices movable into and out of operative position, of the corresponding ballot registering mechanisms, means for moving said ballot registering mechanisms relative to the ballot indicating devices to first operate said ballot registering mechanisms as their ballot indicating devices move to operative position, and subsequently to return the operated ballot indicating devices to unoperated position.

88. In a voting machine, the combination with the ballot indicating devices movable into and out of operative position, of the frame carrying the corresponding ballot registering mechanisms, means for moving said frame vertically and then horizontally to first operate such ballot registering mechanisms as have their ballot indicating devices moved to operative position, and subsequently to return the operated ballot indicating devices to their unoperated position.

89. In a voting machine, registering mechanisms, indicating mechanisms corresponding in number with said registering mechanisms, interlocking mechanisms for said indicating mechanisms, and a movable frame the movement of which causes the actuation of said registers and also renders said interlocking mechanism susceptible of another operation.

90. In a voting machine, registering mechanisms, indicating mechanisms corresponding in number with said registering mechanisms, interlocking mechanisms for said indicating mechanisms, and an edgewise movable frame, the movement of which causes the actuation of said registers and also renders the interlocking mechanism susceptible of another operation.

91. A voting machine comprising individual candidate selecting devices movable into and out of voting position to correct a vote, and arranged in party and office series, straight ticket selecting mechanism operative to move to voted position all individual candidate selecting devices of any given party except such as have been operated in another party series, a plurality of registers corresponding in number and arrangement to said individual candidate selecting devices, and means for subsequently operating all selected registers.

92. In a voting machine, the combination with a movable ballot indicator, of a register, and means for moving said register and indicator relatively toward and from and laterally of each other to cause the actuation of the register and resetting of the indicator.

93. In a voting machine, the combination with a support and a ballot indicator movable thereon, of a register support, a register thereon having a movable actuator adapted to coöperate with the ballot indicator, said register and indicator supports being movable relatively to cause the complete operation of the register and the resetting of the indicator.

94. In a voting machine, the combination with a register support, a register thereon, of a support, a movable ballot indicator thereon coöperating when set or moved with the register, said supports being relatively movable to cause the operation of the register when the indicator is set, the register frame and indicator coöperating directly for causing the resetting of the latter by the relative movement of the register frame and indicator after the actuation of the register during a complete cycle of movement.

95. In a voting machine, the combination with a register-support, a plurality of registers thereon, of a support, a plurality of ballot indicators thereon corresponding in number with the registers and coöperating with the latter when moved to voted position, interlocking mechanism between the indicators, said register and indicator-supports being relatively movable to cause the actuation of the registers whose indicators are moved to voted position, and said register-support coöperating directly with the indicators that have been moved to return them to normal position, whereby the registers are actuated and the indicators reset during a complete cycle of the relative movement of the two supports.

JOHN HOWARD McELROY.

Witnesses:
 ALLAN A. MURRAY,
 F. E. BROM.

Copies of this patent may be obtained for five cents each, by addressing the "Commissioner of Patents, Washington, D. C."